UNITED STATES PATENT OFFICE.

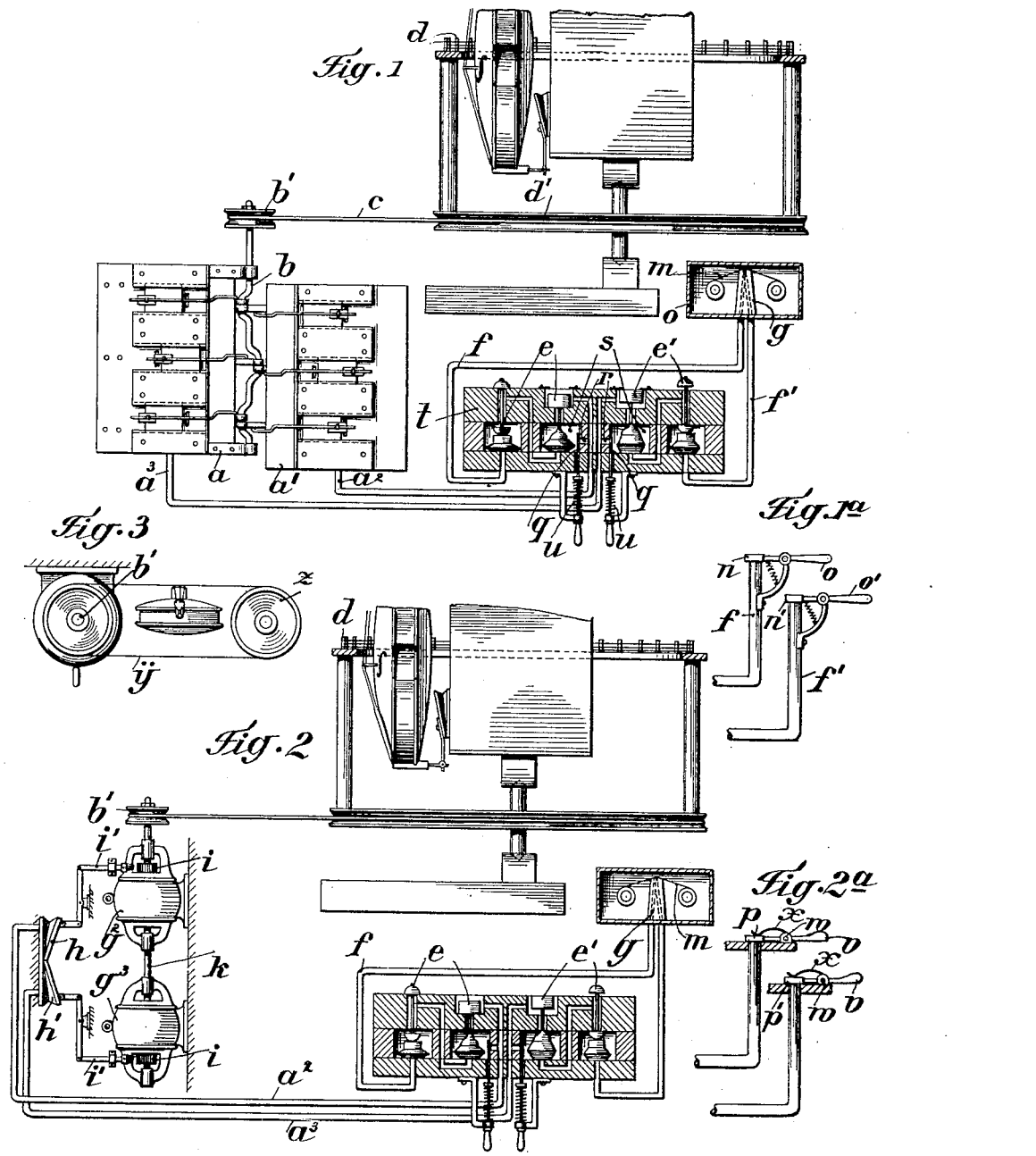

GUSTAV KARL HENNIG, OF BÖHLITZ-EHRENBERG, NEAR LEIPZIG, GERMANY, ASSIGNOR TO THE FIRM OF LUDWIG HUPFELD AKTIENGESELLSCHAFT, OF BÖHLITZ-EHRENBERG, NEAR LEIPZIG, GERMANY.

AUTOMATIC VIOLIN-BOW.

1,131,930. Specification of Letters Patent. Patented Mar. 16, 1915.

Application filed November 6, 1913. Serial No. 799,514.

*To all whom it may concern:*

Be it known that I, GUSTAV KARL HENNIG, a subject of the King of Saxony, residing at 1 Bielastrasse, Böhlitz-Ehrenberg, near Leipzig, Germany, have invented certain new and useful Improvements in Automatic Violin-Bows; and I do hereby declare the following to be a full, clear, and exact description of the invention.

This invention relates more particularly to the operation of the bowing element of pneumatically actuated stringed musical instruments, and has for its object to provide means whereby the bow can be driven in either one or the other direction at will like the customary bow moved by hand, the direction of driving being controlled either from the note sheet of the musical instrument, or by hand, or both.

The object of the invention is to simplify the structure, and thereby permit the use of considerably less elements than have hitherto been used, and to reduce the cost of manufacture.

Referring to the drawings, in which like parts are similarly designated—Figure 1 is a view, partly in section of note sheet controlled pneumatic mechanism for driving a ring bow. Fig. 2 is a similar view of pneumatically controlled electric mechanism for the same purpose. Figs. 1ª and 2ª show manually actuated means for driving the shaft in opposite directions. Fig. 3 is a plan view of a modification of the bowing member.

Referring now to Fig. 1, $d$ is a customary ring bow, provided with a driving wheel $d'$ which is connected by means of a belt, cord, chain, or the like, $c$ to a small pulley or driving wheel $b'$ mounted on a cranked driving shaft $b$. Connected to the cranks of this driving shaft are two wind motors $a$ and $a'$ arranged to drive the shaft $b$ in opposite directions. Wind motor $a'$ is connected by a conduit $a^2$ to a valve-controlled wind chest, the valves $e$ of which are controlled through the conduit $f$ by a music sheet $m$ passing over the tracker bar $g$. The other wind motor $a$ is connected by a conduit $a^3$ with a similar wind chest controlled by valves $e'$, which valves are also controlled by the music sheet $m$ through the conduit $f'$ connected to the tracker bar $g$.

The specific structure of wind motor, and the specific arrangement of the valves $e$ and $e'$ are well known in the art.

The operation of the device is as follows: When a suitable perforation in the music sheet $m$ passes over its corresponding opening in tracker bar $g$ to admit outside air through the conduit $f$ to the valves $e$, suction is produced in the conduit $a^2$, and motor $a'$ is operated, and drives the shaft $b$, and consequently the ring bow $d$ in one direction. Another perforation in the music sheet $m$ passing over the tracker bar $g$ will admit outside air through another tracker bar opening leading to the conduit $f'$ to operate the valves $e'$ to produce suction on the conduit $a^3$ leading to the other wind motor $a$, admission of outside air to the conduit $f$ being simultaneously cut off by the music sheet; consequently the wind motor $a$ will be operated, and the bow driven in the opposite direction.

In Fig. 2, $k$ is a shaft common to two electric motors $g^2$ and $g^3$, provided with commutators $i$ and brush holders $i'$; the brush holders are arranged to be lifted from the commutators, and the motors are wound for rotating in opposite directions. The tracker bar $g$ is connected to valves $e$ and $e'$, as in Fig. 1, and the conduits $a^2$ and $a^3$ instead of leading directly to wind motors, lead, respectively, to pneumatics $h$ and $h'$, which operate the brushes of the respective motors. When the motors are not running the brushes are lifted from their commutators. The direction of rotation of the ring bow $d$ is controlled from the note-sheet $m$ in a manner similar to that described with reference to Fig. 1, one or the other of the pneumatics $h$ or $h'$ being deflated places the brush in contact with its commutator, and causes the operation of its motor, so that the bow is driven in one or the other direction, in accordance with the control of the note sheet. The reversal of direction of driving of the ring bow may also be effected by hand. For this purpose valves $n$ $n'$ (Fig. 1ª) may be arranged above the conduits $f$ $f'$ and may be turned by hand levers $o$ $o'$. If the one or the other of the motors is to be operated the corresponding valve may be moved, so that air is admitted through the corresponding opening of the respective conduit, in the same manner as by a suitable perforation in the note sheet. The control of the motors may also be effected by valves *q* which connect the branches *r* of the conduits *a*² and *a*³ with the suction chambers *s* of the valve-casings *t*. Usually both valves by reason of springs *u* cover the openings of the branches *r*.

In the arrangement of Fig. 2ª the controlling of the conduits *f f'* is effected by valves *p p'* actuated by hand levers *v* turnably mounted in bearings *w*. By action of springs *x* the openings of the conduits are usually closed.

As illustrated in Fig. 3 the bowing member instead of being a ring bow may be an endless band *y*, in which case the driving connection *c* may be omitted. The band *y* runs over a pulley *z* and is driven directly from the pulley *b'* on the shaft of the motors.

I claim as my invention:

1. The combination with a bowing mechanism; of a driving shaft for the bowing mechanism, motors arranged to drive said shaft in opposite directions, and mechanism for causing the operation of either of said motors.

2. The combination with a bowing mechanism; of a driving shaft for the bowing mechanism, wind motors arranged to drive said shaft in opposite directions, and mechanism for causing the operation of either of said motors.

3. The combination with a bowing mechanism; of a driving shaft for the bowing mechanism, motors arranged to drive said shaft in opposite directions, and note sheet controlled mechanism for causing the operation of either of said motors.

4. The combination with a bowing mechanism; of a driving shaft for said mechanism, wind motors arranged to drive said shaft in opposite directions, and note sheet controlled pneumatic mechanism for causing the operation of either of said motors.

5. The combination with a bowing mechanism; of a driving shaft for the bowing mechanism, motors arranged to drive said shaft in opposite directions, and means for manually or pneumatically controlling the operation of either of said motors.

6. The combination with a bowing mechanism; of a driving shaft for the bowing mechanism, wind motors arranged to drive said shaft in opposite directions, and means for manually or pneumatically controlling the operation of either of said motors.

7. The combination with a bowing mechanism, of a rotatable bow-driving-shaft from which said bowing mechanism is driven, two motors to which said shaft is common and arranged for opposite rotation, and means for manually or pneumatically controlling the operation of either of said motors, whereby the duration of the bowing in one or the other direction is controlled.

In testimony whereof, I have signed my name to this specification in the presence of two subscribing witnesses.

GUSTAV KARL HENNIG.

Witnesses:
A. E. GEUDTNER,
RUDOLPH FRICKE.

Copies of this patent may be obtained for five cents each, by addressing the "Commissioner of Patents, Washington, D. C."